US011377121B2

(12) United States Patent
Murakami et al.

(10) Patent No.: US 11,377,121 B2
(45) Date of Patent: Jul. 5, 2022

(54) PROCESSING DEVICE, PROCESSING METHOD, AND PROCESSING PROGRAM

(71) Applicant: TOYOTA JIDOSHA KABUSHIKI KAISHA, Toyota (JP)

(72) Inventors: Kunihiro Murakami, Okazaki (JP); Katsuhiko Sakakibara, Kariya (JP); Makoto Matsushita, Ichinomiya (JP); Junya Sato, Nagoya (JP); Kiyonori Yoshida, Toyota (JP); Tae Sugimura, Miyoshi (JP); Takashi Hayashi, Aichi-gun (JP); Jun Endo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 94 days.

(21) Appl. No.: 16/794,375

(22) Filed: Feb. 19, 2020

(65) Prior Publication Data
US 2020/0290645 A1    Sep. 17, 2020

(30) Foreign Application Priority Data

Mar. 12, 2019   (JP) .............................. JP2019-044916

(51) Int. Cl.
*H04W 4/40* (2018.01)
*B60W 60/00* (2020.01)
*G08G 1/00* (2006.01)

(52) U.S. Cl.
CPC ......... *B60W 60/0024* (2020.02); *G08G 1/202* (2013.01); *G08G 1/205* (2013.01); *G08G 1/207* (2013.01); *H04W 4/40* (2018.02)

(58) Field of Classification Search
CPC .... B60W 60/0024; H04W 4/40; G08G 1/202; G08G 1/205; G08G 1/207
See application file for complete search history.

(56) References Cited

U.S. PATENT DOCUMENTS

2018/0029516 A1* 2/2018 Chelian .................. B25J 11/008
2018/0297612 A1   10/2018 Fukamachi

FOREIGN PATENT DOCUMENTS

JP         2018-180946 A    11/2018

* cited by examiner

*Primary Examiner* — Mathew Franklin Gordon
(74) *Attorney, Agent, or Firm* — Oblon, McClelland, Maier & Neustadt, L.L.P.

(57) ABSTRACT

A processing device that is provided in a building in which a user stays includes a control unit configured to perform: transmitting a request for a vehicle which the user desires to use to move to the building; detecting that the vehicle reaches a vicinity of the building; inquiring of the user about whether access of the vehicle to the inside of the building is permitted when it is detected that the vehicle reaches the vicinity of the building; and guiding at least a part of the vehicle to the inside of the building when the access is permitted by the user.

9 Claims, 10 Drawing Sheets

PROCESSING DEVICE, PROCESSING METHOD, AND PROCESSING PROGRAM

INCORPORATION BY REFERENCE

The disclosure of Japanese Patent Application No. 2019-044916 filed on Mar. 12, 2019 including the specification, drawings and abstract is incorporated herein by reference in its entirety.

BACKGROUND

1. Technical Field

The disclosure relates to a technique of supporting entry and exit of a vehicle for a person with difficulty in walking.

2. Description of Related Art

In recent years, a vehicle which travels autonomously, that is, an automated-driving vehicle, has been proposed. If automated-driving vehicles become common, a user who does not drive a vehicle will be able to move to a destination by setting the destination in an automated-driving vehicle. Japanese Patent Application Publication No. 2018-180946 (JP 2018-180946 A) discloses an automatic operating device that transmits a notification regarding whether an occupant has entered or exited an automated-driving vehicle after the automated-driving vehicle has arrived at a set destination.

SUMMARY

When a user who has difficulty in walking uses a vehicle, the user needs another person's help at the time of movement from a door of a home to the vehicle which the user enters. In the case of a manned taxi, the driver may provide help. However, in the case of an automated-driving vehicle, a particular helper is necessary. When a family member of the user provides help, a heavy burden may be imposed on the helper such as when helping an aged person. These problems are the same when the user exits the vehicle.

The disclosure provides a technique of supporting a user's movement between a building in which the user stays and a vehicle.

According to a first aspect of the disclosure, there is provided a processing device that is provided in a building in which a user stays, the processing device including a control unit configured to perform: requesting a vehicle which the user desires to use to move to the building; detecting that the vehicle reaches a vicinity of the building; inquiring of the user about whether access of the vehicle to the inside of the building is permitted when it is detected that the vehicle reaches the vicinity of the building; and guiding at least a part of the vehicle to the inside of the building when the access is permitted by the user.

According to a second aspect of the disclosure, there is provided a processing method of causing a computer, which is provided in a building in which a user stays, to perform: requesting a vehicle which the user desires to use to move to the building; detecting that the vehicle reaches a vicinity of the building; inquiring of the user about whether access of the vehicle to the inside of the building is permitted when it is detected that the vehicle reaches the vicinity of the building; and guiding at least a part of the vehicle to the inside of the building when the access is permitted by the user.

According to a third aspect of the disclosure, there is provided a program causing a computer to perform the processing method or a non-transitory computer-readable storage medium storing the program non-transitorily.

According to the disclosure, it is possible to provide a technique of supporting a user's movement between a building in which the user stays and a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

By using a vehicle which travels autonomously, that is, an automated-driving vehicle (hereinafter simply referred to as a vehicle), a user who does not drive a vehicle can move to a destination using the vehicle. On the other hand, when a user who has difficulty walking uses a vehicle, the user needs another person's help at the time of movement from a door of a building to the vehicle which the user enters. Particularly, equipment for assisting with walking such as a handrail or an elevator is often installed in a building, but since such equipment is scarce outdoors, labor is required for movement between a building and a vehicle.

Therefore, a processing device according to this embodiment requests a vehicle which a user desires to use to move to a building, inquires of the user about whether access to the inside of the building is permitted when the vehicle arrives in the vicinity of the building, and guides at least a part of the vehicle to the inside of the building when the access is permitted.

Accordingly, the processing device according to this embodiment supports movement of a user who uses a vehicle between the building and the vehicle. For example, the processing device according to this embodiment causes the vehicle to enter a site of the building and guides the vehicle to a position at which the user easily enters or exits the vehicle. Movement of the user is supported by loading the user on an auxiliary moving device which is mounted in the vehicle and guiding the auxiliary moving device between the building and the vehicle.

Figure 1:
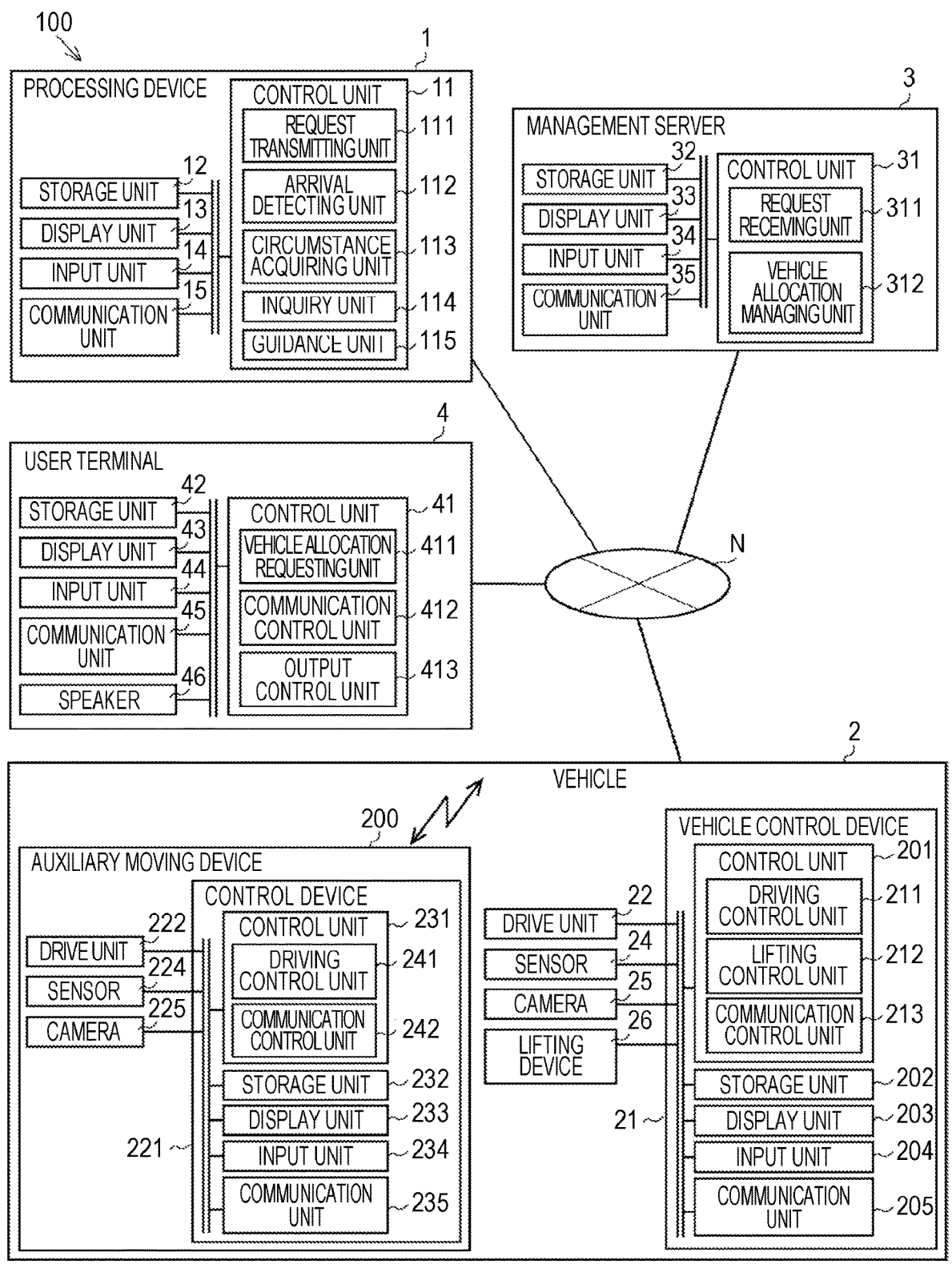
FIG. 1 is a diagram of a configuration of a vehicle management system or the like according to a first embodiment.

In this embodiment, the auxiliary moving device is a device that can load a user thereon and move and examples thereof include an electric wheelchair, a mobility scooter, a personal mobility, a baby carriage, and a stretcher System Configuration FIG. 1 is a diagram of a configuration of a vehicle management system 100 or the like according to the embodiment. The vehicle management system 100 includes a processing device 1, a vehicle 2, and a management server 3 for the vehicle 2. One processing device and one vehicle 2 are illustrated in FIG. 1, but the vehicle management system 100 includes a plurality of processing devices 1 and a plurality of vehicles 2. The processing device 1, the vehicle 2, and the management server 3 can communicate with each other via a communication network N such as the Internet. The communication network N includes at least a radio link through which the vehicles 2 can be wirelessly connected to each other. Each vehicle 2 is an automated-driving vehicle that receives control information from the processing device 1 and can travel autonomously to a destination indicated by the control information.

The processing device 1 is a computer that is provided in a building in which a user stays and guides a vehicle which has arrived in the vicinity of the building. The processing device 1 includes a control unit 11, a storage unit 12, a display unit 13, an input unit 14, and a communication unit 15.

The control unit 11 controls the operations of the processing device 1 and realizes various functions of the processing device 1. The control unit 11 includes, for example, a central processing unit (CPU), a read only memory (ROM), and a random access memory (RAM). The CPU comprehensively controls the operations of the processing device 1. The ROM is a storage medium that stores various programs or data. The RAM is a storage medium that temporarily stores various programs or rewrites various types of data. The CPU executes a program which is stored in the ROM, the storage unit 12, or the like using the RAM as a work area. The control unit 11 realizes a request transmitting unit 111, an arrival detecting unit 112, a circumstance acquiring unit 113, an inquiry unit 114, and a guidance unit 115 by executing the program.

The request transmitting unit 111 transmits request information for requesting use of a vehicle 2 to the management server 3. For example, when a user inputs a request for use of the vehicle 2 to the processing device 1 using the input unit 14 of the processing device 1 or a user terminal 4 such as a smartphone, the processing device 1 transmits the request information to the management server 3. When a user inputs information such as a vehicle allocation time, a destination, or necessary equipment in addition to the request for use, the request transmitting unit 111 adds the input information to the request information and transmits the request information to the management server 3. In this embodiment, the request transmitting unit 111 adds information indicating that support of movement (movement support) between a building and a vehicle is needed to the request information and transmits the request information.

The arrival detecting unit 112 detects that the vehicle 2 has arrived at the building to which allocation of a vehicle is requested. Arrival of a vehicle at a building includes, for example, a case in which the vehicle enters the building, a case in which the vehicle 2 enters the same site of the building, and a case in which the vehicle 2 arrives in the vicinity of the building. Here, the case in which the vehicle 2 arrives in the vicinity of a building includes, for example, a case in which the vehicle 2 arrives at a road adjacent to the site of the building, a case in which a distance between the building and the vehicle 2 is equal to or less than a threshold value, a case in which the vehicle 2 can arrive within a predetermined time based on the distance between the building and the vehicle 2 and a speed of the vehicle 2, and a case in which the vehicle 2 arrives at a predetermined area.

The circumstance acquiring unit 113 acquires circumstance information indicating external circumstances such as the outside air temperature, the weather, and the traffic conditions from the vehicle 2 or the management server 3.

When it is detected that a vehicle arrives, the inquiry unit 114 inquires of a user about whether access of the vehicle to the inside of the building is permitted. For example, the inquiry unit 114 transmits the message "The vehicle has arrived. Is access permitted?" to the user terminal 4 such that the message is displayed on a display unit or voice thereof is output from a speaker. The inquiry unit 114 acquires the user's response to the inquiry. For example, the user inputs response information indicating whether the access is permitted using the input unit 14 of the processing device 1 or the user terminal 4 and the inquiry unit 114 acquires the response information.

The guidance unit 115 guides at least a part of the vehicle 2 to the inside of the building when the access is permitted by the user.

Figure 2:
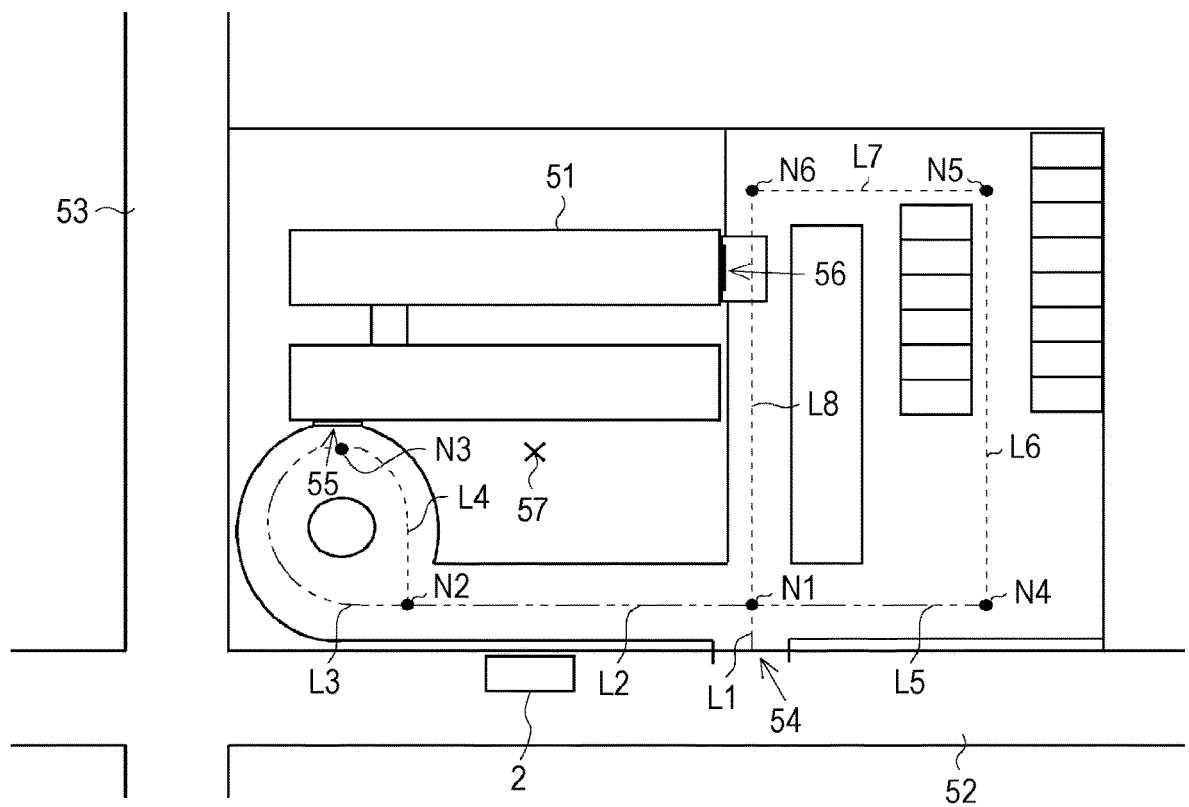
FIG. 2 is a diagram illustrating an example of guidance of a vehicle.

FIG. 2 is a diagram illustrating an example of guidance of a vehicle 2. In FIG. 2, a site of a building 51 in which a user stays is adjacent to roads 52 and 53 and the user moves between the site and the road 52 via a doorway 54. The building 51 includes a plurality of doors 55 and 56 and the user enters and exits the building 51 via the doors 55 and 56. A representative point 57 indicates a position of the building 51 on a map such as an address of the building 51.

When the position of the building 51 (the representative point 57) to which a vehicle 2 is allocated is indicated by the management server 3, the vehicle 2 acquires a route to the representative point 57 and travels based on the route. Accordingly, when the vehicle 2 arrives at a position on the road 52 which is closest to the representative point 57, the vehicle 2 and the guidance unit 115 determine that the vehicle 2 has arrived at the building 51. The guidance unit 115 transmits a control signal to the vehicle 2 and guides the vehicle 2 to the site of the building 51. This guidance route is set as user information for each user in advance and registered in the processing device 1.

The processing device 1 sets passages L1 to L3 and nodes N1 to N3 out of vehicle passages (links) L1 to L8 and branch points (nodes) N1 to N6 in the site as a route which is used by the user and stores information indicating the route as user information. This route may be determined depending on the weather, the outside air temperature, or the like, such that the route is constituted by the links L1 to L3 when it is not raining and constituted by the links L1 and L5 to L8 when it is raining.

In the example illustrated in FIG. 2, the guidance unit 115 guides the vehicle 2 to the front of the door 55 (the node N3) by causing the vehicle 2 to turn left at the position of the doorway 54, to enter the link L1, to turn left at the node N1, to move straight along the link L2, to turn right, and to move along the link L3 as indicated by a line alternating between a long dash and two short dashes. In the example illustrated in FIG. 2, the vehicle 2 is guided to the front of the door 55 of the building 51, but the vehicle 2 may be guided to the inside of the building 51 as long as the vehicle 2 can travel in the building 51. The position at which the user enters the vehicle such as the door 55 or the door 56 may be registered as user information, and a route having the shortest distance out of the links L1 to L8 may be acquired as the guidance route based on the entry position and the current position of the vehicle.

The guidance unit 115 can guide an auxiliary moving device 200 which is mounted in the vehicle 2 to the inside of the building. The guidance route is set as user information for each user in advance and registered in the processing device 1.

The processing device 1 sets passages L21 to L25 out of vehicle passages (links) L21 to L28 and nodes N21 to N24 in the building as a route which is used by the user and stores information indicating the route as user information. This route may be determined depending on the weather, the outside air temperature, or the like. Some of the links or nodes are illustrated in FIGS. 2 and 3, but the links or nodes are not limited to those illustrated in FIGS. 2 and 3.

Figure 3:
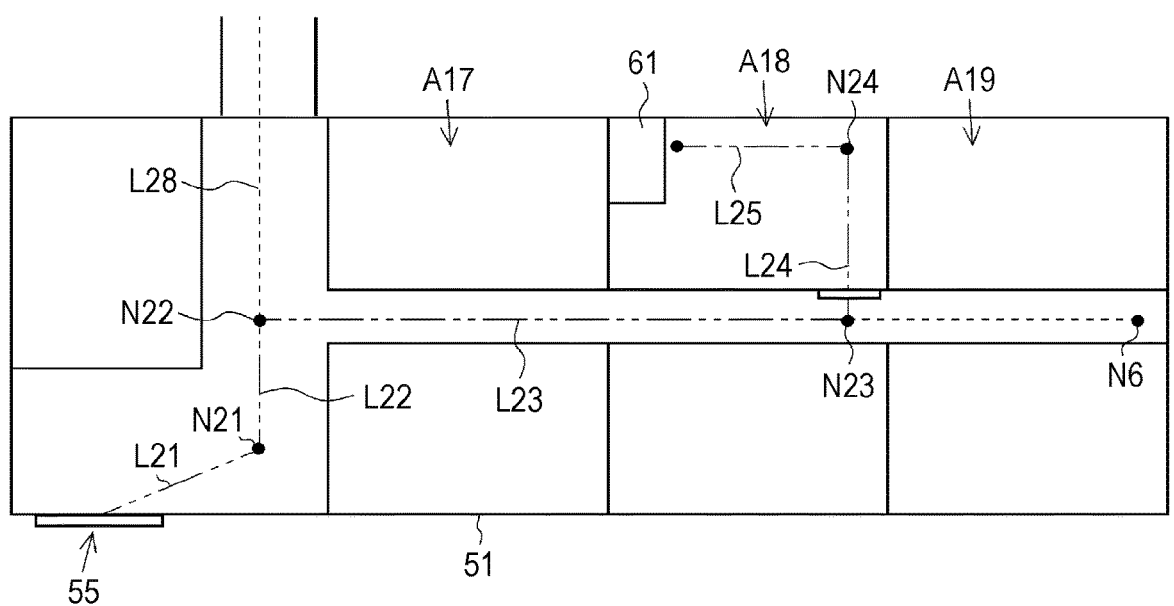
FIG. 3 is a diagram illustrating an example of guidance of an auxiliary moving device.

FIG. 3 is a diagram illustrating an example of guidance of the auxiliary moving device 200. The guidance unit 115 transmits a control signal to the auxiliary moving device 200 and guides the auxiliary moving device 200 into the building 51.

When the auxiliary moving device 200 is located in front of the door 55, the guidance unit 115 controls the door 55 such that the door 55 is open. Then, as indicated by a line alternating between a long dash and two short dashes in FIG. 3, the guidance unit 115 causes the auxiliary moving device 200 to enter the passage L21 in the building 51 via the door 55, to move in the passage L22 along the right wall, to turn right at the branch point (node) N22, to move straight a predetermined distance in the passage L23, and to stop in front of the door 59 (the node N23). The guidance unit 115 controls the door 59 such that the door 59 opens, and causes the auxiliary moving device 200 to enter the passage L24 in a room A18 via the door 59, to turn left at the node N24, to move in the passage L25, and to stop at the side of a bed 61. Accordingly, the user can transfer from the bed 61 to the auxiliary moving device 200. The position of the room A18 or the bed 61 of the user may be stored as user information, and a shortest route may be acquired as the guidance route out of the links L21 to L32 based on the position of the room A18 or the bed 61 and the entry position when the position at which the user enters the vehicle 2 such as the door 55 or the door 56 is determined depending on the circumstance information or the like. When the door 55 of the building 51 and the room A18 in which the user stays are located on different floors, the processing device 1 may control an elevator such that the auxiliary moving device 200 is moved using the elevator. The operation of the door or the elevator is not limited to control by the processing device 1, and may be performed by an occupant of the vehicle 2 or a family member of the user.

The storage unit 12 is a storage device such as a hard disk drive (HDD) or a solid state drive (SSD). The storage unit 12 stores route information of the inside of a building or the like.

The display unit 13 is a unit that displays information and examples thereof include a liquid crystal display (LCD) device and an organic electroluminescence (EL) display device. The input unit 14 is a unit that receives an operator's operation, examples thereof include a keyboard and a mouse, and resource information, support information, or the like is input thereto. The input unit 14 may be a unit that receives resource information or support information from another device. The communication unit 15 is a communication interface for communication with an external device.

A vehicle 2 will be described below. The vehicle 2 includes a vehicle control device 21, a drive unit 22, a sensor 24, a camera 25, a lifting device 26, and an auxiliary moving device 200.

The drive unit 22 is a mechanism that causes the vehicle 2 to travel and includes a power source such as an internal combustion engine or a motor, a transmission, a brake mechanism, and a steering mechanism.

The sensor 24 includes a vehicle speed sensor, an acceleration sensor, a direction sensor, a rainfall sensor, a temperature sensor, and an obstacle sensor and detects a host vehicle state or circumstances. The obstacle sensor may include a camera, a radar, or a laser imaging detection and ranging (LiDAR).

The camera 25 is a unit that images surroundings of the host vehicle. For example, a plurality of cameras 25 may be provided and capture images at the front, rear, right, and left sides of the vehicle or the like. An image which is captured by the camera 25 may be a moving image or a still image. In this embodiment, the camera 25 may be used as a sensor that acquires information indicating circumstances.

The lifting device 26 is a device that loads the auxiliary moving device 200 onto the vehicle 2 or unloads the auxiliary moving device 200 from the vehicle 2 and examples thereof include a slope or a lift.

The auxiliary moving device 200 is a device that can have a user loaded thereon and move autonomously, and examples thereof include an electric wheelchair, a mobility scooter, and a personal mobility.

The vehicle control device 21 is a computer that is mounted in the vehicle 2 and includes a control unit 201, a storage unit 202, a display unit 203, an input unit 204, and a communication unit 205.

The control unit 201 controls all the operations of the vehicle control device 21 and realizes various functions of the vehicle control device 21. The control unit 201 includes, for example, a CPU, a ROM, and a RAM. The CPU comprehensively controls the operations of the vehicle control device 21. The ROM is a storage medium that stores various programs or data. The RAM is a storage medium that temporarily stores various programs or data. The RAM may be directly accessed by the CPU and serve as a main memory. The CPU executes a program which is stored in the ROM, the storage unit 202, or the like using the RAM as a work area. The control unit 201 realizes a driving control unit 211, a lifting control unit 212, and a communication control unit 213 by executing the program (hereinafter also referred to as an emergency program).

The driving control unit 211 performs control for causing the host vehicle to travel autonomously to a destination. For example, when control information is acquired from the processing device 1 or the management server 3, the driving control unit 211 performs automated driving to a destination which is indicated by the control information or performs automated driving based on a route which is indicated by the control information.

The lifting control unit 212 performs an operation of loading the auxiliary moving device 200 onto the vehicle 2 using the lifting device 26 or an operation of unloading the auxiliary moving device 200 from the vehicle 2 using the lifting device 26.

The communication control unit 213 controls communication between the communication unit 205 and an external device. The communication control unit 213 is connected to, for example, the processing device 1 or the management server 3 via the communication network N and acquires control information.

The storage unit 202 is a storage device such as an HDD or an SSD. The storage unit 202 functions as an external storage device of the control unit 201. The storage unit 202 stores map information or the like. The display unit 203 is a unit that displays information and examples thereof include a liquid crystal display device and an organic EL display device. The display unit 203 is provided in a passenger compartment and provides display for an occupant or a passenger in the passenger compartment.

The input unit 204 is a unit that receives a user's operation and examples thereof include buttons or a touch panel. The communication unit 205 is a communication interface that communicates with an external device. The communication unit 205 may include a plurality of communication interfaces such as a communication interface that performs communication via the communication network N and a communication interface that communicates directly with another vehicle. Examples of the communication interface that communicates directly with another vehicle include communication interfaces that perform communication using an ad hoc mode of Bluetooth (registered trademark), ZigBee (registered trademark), or WiFi. The communication interface may be a communication interface that performs communication using a commercial radio (a simplicity radio).

The auxiliary moving device 200 includes a control device 221, a drive unit 222, a sensor 224, and a camera 225.

The drive unit 222 is a mechanism that allows the auxiliary moving device 200 to travel and includes a power source such as an internal combustion engine or a motor, a transmission, a brake mechanism, and a steering mechanism.

The sensor 224 includes a vehicle speed sensor, an acceleration sensor, a direction sensor, a temperature sensor, and an obstacle sensor and detects a host vehicle state or circumstances. The obstacle sensor may include a camera, a radar, or a Laser Imaging Detection and Ranging (LiDAR).

The camera 225 is a unit that images surroundings of the host vehicle. For example, a plurality of cameras 225 may be provided and capture images of the front, rear, right, and left sides of the auxiliary moving device 200 or the like. An image which is captured by the camera 225 may be a moving image or a still image. In this embodiment, the camera 225 may be used as a sensor that acquires information indicating circumstances.

The vehicle control device 221 is a computer that is mounted in the auxiliary moving device 200 and includes a control unit 231, a storage unit 232, a display unit 233, an input unit 234, and a communication unit 235.

The control unit 231 controls all the operations of the control device 221 and realizes various functions of the control device 221. The control unit 231 includes, for example, a CPU, a ROM, and a RAM. The CPU comprehensively controls the operations of the control device 221. The ROM is a storage medium that stores various programs or data. The RAM is a storage medium that temporarily stores various programs or data. The RAM may be directly accessed by the CPU and serve as a main memory. The CPU executes a program which is stored in the storage unit 232, the storage unit 202, or the like using the RANI as a work area. The control unit 231 realizes a control unit 231, a driving control unit 241, and a communication control unit 242 by executing the program (hereinafter also referred to as an emergency program).

The driving control unit 241 performs control for allowing the auxiliary moving device 200 to travel autonomously to a designated position (a destination). For example, when control information is acquired from the processing device 1 or the vehicle 2, the driving control unit 241 performs automated driving to a destination which is indicated by the control information or performs automated driving based on a route which is indicated by the control information.

The communication control unit 242 controls communication between the communication unit 235 and an external device. The communication control unit 242 is connected to, for example, the processing device 1 or the management server 3 via the communication network N and acquires control information.

The storage unit 232 is a storage device such as an HDD or an SSD. The storage unit 232 functions as an external storage device of the control unit 231. The storage unit 232 stores map information or the like. The display unit 233 is a unit that displays information and examples thereof include a liquid crystal display device and an organic EL display device. The display unit 233 provides display for a user.

The input unit 234 is a unit that receives a user's operation and examples thereof include buttons or a touch panel. The communication unit 235 is a communication interface that communicates with an external device. The communication unit 235 may include a plurality of communication interfaces such as a communication interface that performs communication via the communication network N and a communication interface that communicates directly with another vehicle. Examples of the communication interface that communicates directly with another vehicle include communication interfaces that perform communication using an ad hoc mode of Bluetooth, ZigBee, or WiFi. The communication interface may be a communication interface that performs communication using a business radio (a simplicity radio).

The management server 3 is a computer that communicates with the processing device 1 or the vehicle 2 via the communication network N, and serves to receive a request for use from a user who desires to use a vehicle 2 and to allocate a vehicle 2 to a building in which the user stays. The management server 3 includes a control unit 31, a storage unit 32, a display unit 33, an input unit 34, and a communication unit 35.

The control unit 31 controls all the operations of the management server 3 management server 3 and realizes various functions of the management server 3. The control unit 31 includes, for example, a CPU, a ROM, and a RAM. The CPU comprehensively controls the operations of the management server 3. The ROM is a storage medium that stores various programs or data. The RAM is a storage medium that temporarily stores various programs or rewrites various types of data. The CPU executes a program which is stored in the ROM, the storage unit 32, or the like using the RAM as a work area. The control unit 31 realizes a request receiving unit 311 and a vehicle allocation control unit 312 by executing the program.

The request receiving unit 311 receives request information for requesting use of a vehicle 2 from the processing device 1. Here, request information includes information such as a user ID, an entry position, an exit position, a vehicle allocation time, and whether movement is to be assisted. The user ID is information for uniquely identifying a user. The entry position is information indicating a position at which a user enters a vehicle and the exit position is information indicating a position at which a user exits a vehicle. In this embodiment, the entry position or the exit position may be a position of a building in which the user stays. Whether movement is to be assisted is information indicating whether the auxiliary moving device 200 is necessary when a user moves between a building in which the user stays and a vehicle 2.

The vehicle allocation control unit 312 allocates a vehicle 2 in response to request information received from a user. For example, the vehicle allocation control unit 312 generates control information such that the vehicle 2 arrives at the entry position at a vehicle allocation time, loads a user therein, and moves from the entry position to the exit position, and transmits the generated control information to the vehicle 2.

The storage unit 32 is a storage device such as an HDD or an SSD. The display unit 33 is a unit that displays information and examples thereof include a liquid crystal display device and an organic EL display device. The input unit 34 is a unit that receives an operator's operation and examples thereof include a keyboard and a mouse. The input unit 34 may be a unit that receives resources information or support information from another device. The communication unit 35 is a communication interface that communicates with an external device.

The user terminal 4 is a smartphone or a computer such as a tablet PC which is carried by a user and includes a control unit 41, a storage unit 42, a display unit 43, an input unit 44, a communication unit 45, and a speaker 46.

The processing unit (control unit) 41 controls all the operations of the user terminal 4 and realizes various functions of the user terminal 4. The control unit 41 includes, for example, a CPU, a ROM, and a RAM. The CPU comprehensively controls the operations of the user terminal 4. The ROM is a storage medium that stores various programs or data. The RAM is a storage medium that temporarily stores various programs or data. The RAM may be directly accessed by the CPU and serve as a main memory. The CPU executes a program which is stored in the ROM, the storage unit 42, or the like using the RAM as a work area. The control unit 41 realizes a vehicle allocation requesting unit 411, a communication control unit 412, and an output control unit 413 by executing the program (hereinafter also referred to as an emergency program).

When information indicating use of a vehicle 2 such as information indicating an entry position, a destination, a vehicle allocation time, and the like is input through a user's operation, the vehicle allocation requesting unit 411 inputs request information including the input information to the processing device 1. Information which is stored in the storage unit 42 in advance may be read and used as the entry position.

The communication control unit 412 performs reception of information from the processing device 1 and transmission of information to the processing device 1. For example, the communication control unit 412 receives information on an inquiry about whether access to the inside of a building is permitted from the processing device 1. The communication control unit 412 transmits information indicating a response to the information on an inquiry to the processing device 1.

The output control unit 413 outputs information received from the processing device 1 from the display unit 43 or the speaker 46. For example, the output control unit 413 displays the information on an inquiry received from the processing device 1 on the display unit 43 or outputs the information on an inquiry as voice message from the speaker 46.

Processing Method

Figure 4A:
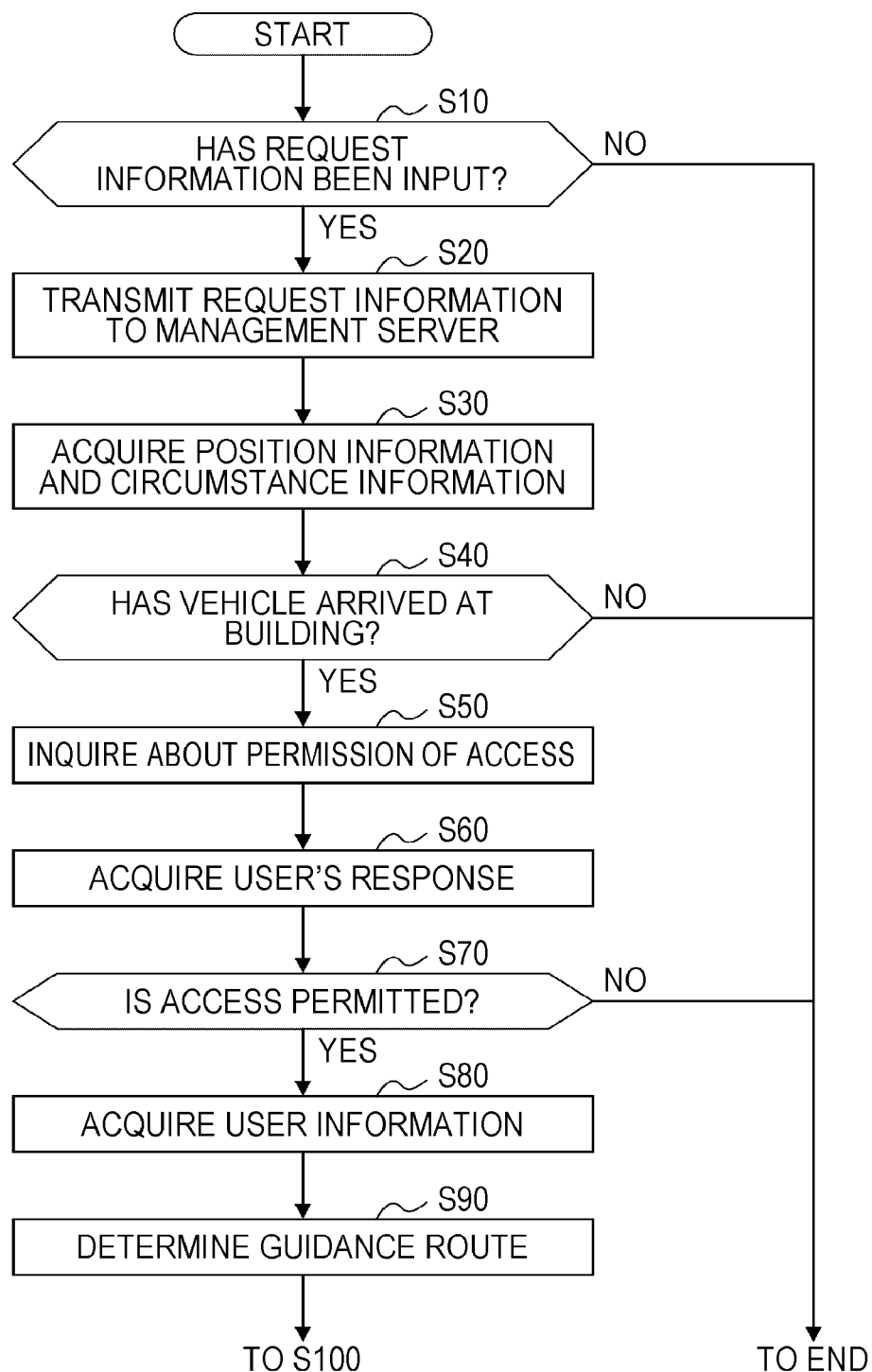
FIG. 4A is a (first) flowchart illustrating a processing method which is performed in accordance with a processing program by a processing device.
Figure 4B:
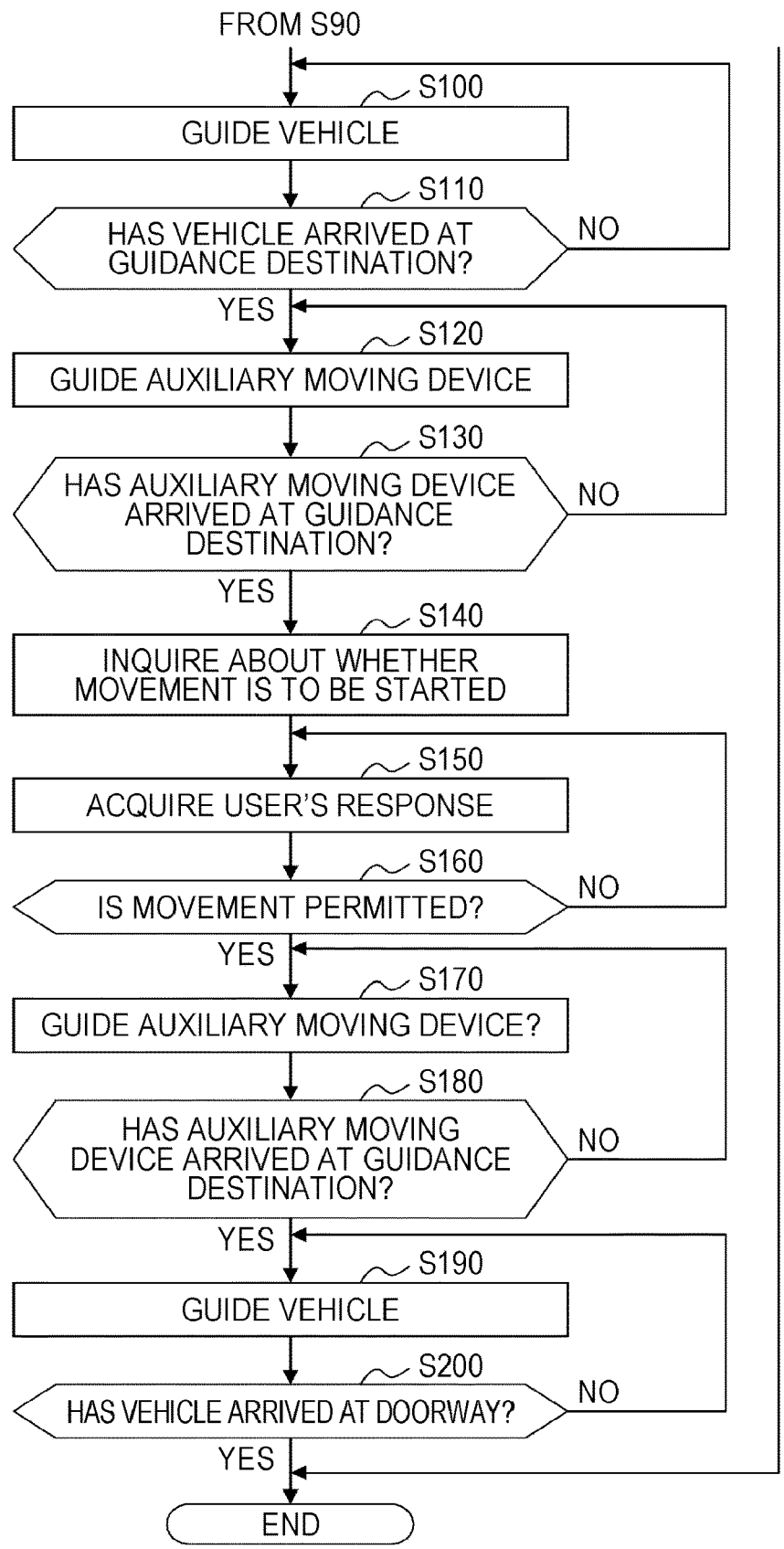
FIG. 4B is a (second) flowchart illustrating the processing method which is performed in accordance with the processing program by the processing device.

A process flow which is performed by the processing device 1 will be described below. FIGS. 4A and 4B are flowcharts illustrating a processing method which is performed in accordance with a processing program by the processing device 1. The processing device 1 performs the process flow illustrated in FIGS. 4A and 4B when it is powered on. The process flow of FIGS. 4A and 4B is repeatedly performed until it is powered off or an instruction to stop is issued.

In Step S10, the processing device 1 determines whether request information for requesting use of a vehicle 2 has been input.

The processing device 1 ends the process flow of FIGS. 4A and 4B when the determination result of Step S10 is negative, and the processing device 1 transmits the input request information to the management server 3 in Step S20 when the determination result is positive.

In Step S30, the processing device 1 acquires position information and circumstance information of the requested vehicle 2.

In Step S40, the processing device 1 determines whether the vehicle 2 has arrived in the vicinity of the building 51 based on the position information acquired in Step S30. When the determination result of Step S40 is negative, the processing device 1 ends the process flow of FIGS. 4A and 4B.

When the determination result of Step S40 is positive, that is, when it is detected that the vehicle 2 has arrived in the vicinity of the building 51 in which a user stays, the processing device 1 presents the circumstance information to the user and inquires of the user about whether access to the inside of the building is to be permitted in Step S50. For example, the processing device 1 transmits the circumstance information indicating external circumstances such as the outside air temperature, the weather, the congestion situation, and a scheduled arrival time at a destination to the user terminal 4 such that the circumstance information is displayed on a display unit or output as a voice message. On the other hand, the user ascertains whether the user is well prepared such as whether a change of clothes is necessary depending on the outside air temperature or whether the medicine for a chronic disease is to be added when an arrival time is delayed, and inputs "permitted" when the user is well prepared and "not permitted" when the user is not well prepared to the processing device 1 using the input unit or the user terminal 4. When the access is not permitted, the user may input a time required for permission.

In Step S60, the processing device 1 acquires the user's response to the inquiry of Step S50.

In Step S70, the processing device 1 determines whether the user's response acquired in Step S60 indicates permission of the access.

When the determination result of Step S70 is negative, the processing device 1 ends the process flow of FIGS. 4A and 4B. When a time required for permission is input, the processing device 1 may wait for the time and then acquire the user's response again in Step S60.

On the other hand, when the determination result of Step S70 is positive, the processing device 1 acquires user information of the user from the storage unit in Step S80.

In Step S90, the processing device 1 acquires a guidance route of the vehicle 2 based on the current position of the vehicle 2 and the user information.

In Step S100, the processing device 1 generates control information based on the guidance route acquired in Step S90 and guides the vehicle 2 by transmitting the control information to the vehicle 2.

In Step S110, the processing device 1 determines whether the vehicle 2 has arrived at a target position to which the vehicle 2 is guided (a guidance destination), for example, an entry position or an exit position. In the example illustrated in FIG. 2, the target position is the door 55.

When the determination result of Step S110 is negative, the processing device 1 performs guidance again in Step S100. On the other hand, when the vehicle 2 has arrived at the guidance destination, the vehicle 2 controls the lifting device 26 such that the auxiliary moving device 200 is unloaded from the vehicle 2.

Figure 5:
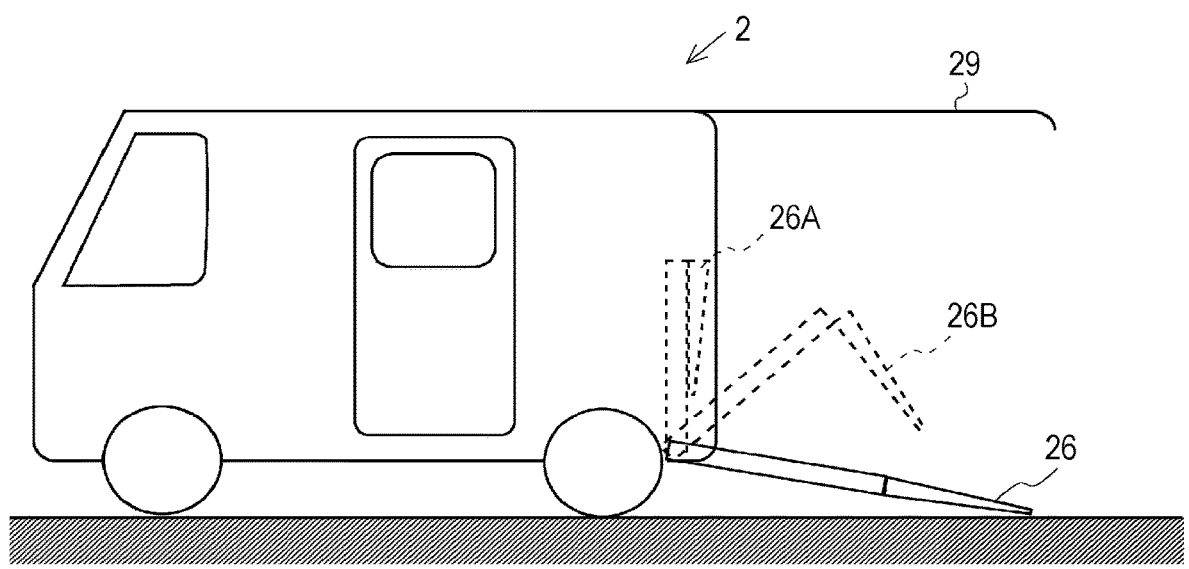
FIG. 5 is a diagram illustrating an operation of a lifting device.

FIG. 5 is a diagram illustrating an operation of the lifting device 26. In FIG. 5, the lifting device 26 is a slope which is attached to the rear of the vehicle 2. When the lifting device 26 is not used, the lifting device 26 is folded and is stored in the vehicle body in an upright state. In FIG. 5, a lifting device 26A in a stored state is indicated by a dotted line. When the lifting device 26A is used, the vehicle control device 21 opens a rear door 29, unfolds the lifting device 26A, and rotates the lifting device 26A to fall down rearward. In FIG. 5, a lifting device 26B which is being unfolded is indicated by a dotted line. The vehicle control device 21 fully unfolds the lifting device 26 and rotates the lifting device 26 until the rear end thereof comes into contact with the ground, whereby a slope over the auxiliary moving device 200 ascends or descends is formed. The auxiliary moving device 200 unloads the slope from the vehicle.

In this way, when the vehicle 2 arrives at a guidance destination and the determination result of Step S110 is positive, the processing device 1 generates control information based on the guidance route acquired in Step S90 and guides the auxiliary moving device 200 by transmitting the control information to the auxiliary moving device 200 in Step S120.

In Step S130, the processing device 1 determines whether the auxiliary moving device 200 has arrived at a target position to which the auxiliary moving device 200 is guided (a guidance destination), for example, an entry position or an exit position. In the example illustrated in FIG. 3, the guidance destination is one side of a bed 61. When the auxiliary moving device 200 arrives at the side of the bed 61, the user transfers from the bed 61 to the auxiliary moving device 200. The guidance destination of the auxiliary moving device 200 is not limited to the bed side, and can be set to an arbitrary position such as the outside of the door 59 or a living room in a room A18.

When the determination result of Step S130 is negative, the processing device 1 performs guidance again in Step S120. On the other hand, when the determination result of Step S130 is positive, the processing device 1 inquires of the user about whether movement to the vehicle 2 is to be started in Step S140. For example, the processing device 1 transmits a message of "May movement be started?" to the user terminal 4 such that the message is displayed on the display unit or output as voice from the speaker.

In Step S150, the processing device 1 acquires the user's response to the inquiry in Step S140.

In Step S160, the processing device 1 determines whether the user's response acquired in Step S150 indicates that movement is to be started.

When the determination result of Step S160 is negative, the processing device 1 repeatedly acquires the user's response in Step S150.

On the other hand, when the determination result of Step S160 is positive, the processing device 1 generates control information such that the auxiliary moving device 200 transfers to the vehicle 2 based on the guidance route acquired in Step S90 and guides the auxiliary moving device 200 by transmitting the control information to the auxiliary moving device 200 in Step S170.

In Step S180, the processing device 1 determines whether the auxiliary moving device 200 has arrived at the vehicle 2 and has been stored in the vehicle 2.

When the determination result of Step S180 is negative, the processing device 1 repeatedly guides the auxiliary moving device 200 in Step S170.

On the other hand, when the auxiliary moving device 200 has arrived at the position of the vehicle 2, the auxiliary moving device 200 ascends the slope (the lifting device 26) and enters the vehicle 2, and the vehicle control device 21 of the vehicle 2 stores the lifting device 26 and closes the rear door 29.

In this way, when the auxiliary moving device 200 arrives at the vehicle 2 and the determination result of Step S180 is positive, the processing device 1 generates control information such that the vehicle 2 moves from the door 55 to the doorway 54 based on the guidance route acquired in Step S90 and guides the vehicle 2 by transmitting the control information to the vehicle 2 in Step S190.

In Step S200, the processing device 1 determines whether the vehicle 2 has arrived at the doorway 54. When the determination result of Step S200 is negative, the processing device 1 performs guidance again in Step S190. On the other hand, when the determination result of Step S200 is positive, that is, when the vehicle 2 has been guided to the doorway 54, the processing device 1 ends the process flow of FIGS. 4A and 4B and the vehicle 2 sets the exit position acquired from the management server 3 as a destination and travels autonomously.

In this way, according to this embodiment, since the processing device 1 guides the vehicle 2, it is possible to support movement of the user who uses the vehicle 2 between the building 51 and the vehicle 2.

The processing device 1 according to this embodiment guides the auxiliary moving device 200 to the inside of the building 51 when access to the inside of the building 51 is permitted. Accordingly, it is possible to support loading the user into the auxiliary moving device 200 inside the building 51, particularly, a position at which the user stays such as a bed side, in which the vehicle 2 cannot travel and moving the user to the vehicle 2.

When the user returns to the building 51 using the vehicle 2, the processing device 1 can guide the vehicle 2 having arrived in the vicinity of the building 51 in the same way as illustrated in FIGS. 4A and 4B, whereby it is possible to support unloading the user from the vehicle 2 and moving the user to the room A18 in the building 51 in which the user stays.

When the vehicle 2 arrives and stops in the vicinity of the building 51, the processing device 1 according to this embodiment acquires the stop position of the vehicle 2, acquires a guidance route from the stop position to the inside of the building 51, and guides the auxiliary moving device 200 based on the guidance route. Accordingly, it is possible to appropriately guide the auxiliary moving device 200.

When it is inquired about whether access to the inside of the building is to be permitted, the processing device 1 according to this embodiment notifies the user of at least one of the outside air temperature, the weather, and the scheduled arrival time at a destination. Accordingly, the user can determine whether the access is to be permitted depending on the external circumstances.

MODIFIED EXAMPLE

In the above-mentioned embodiment it is inquired whether the access is to be permitted at a time point at which the vehicle 2 has arrived in the vicinity of the building 51, but in a modified example, it is inquired whether the access to the inside of the building 51 is to be permitted at a time point at which the vehicle 2 has arrived at the entry position or the exit position. Since the other configurations are the same as described in the first embodiment, the same elements will be referred to by the same reference signs and description thereof will not be repeated.

Figure 6A:
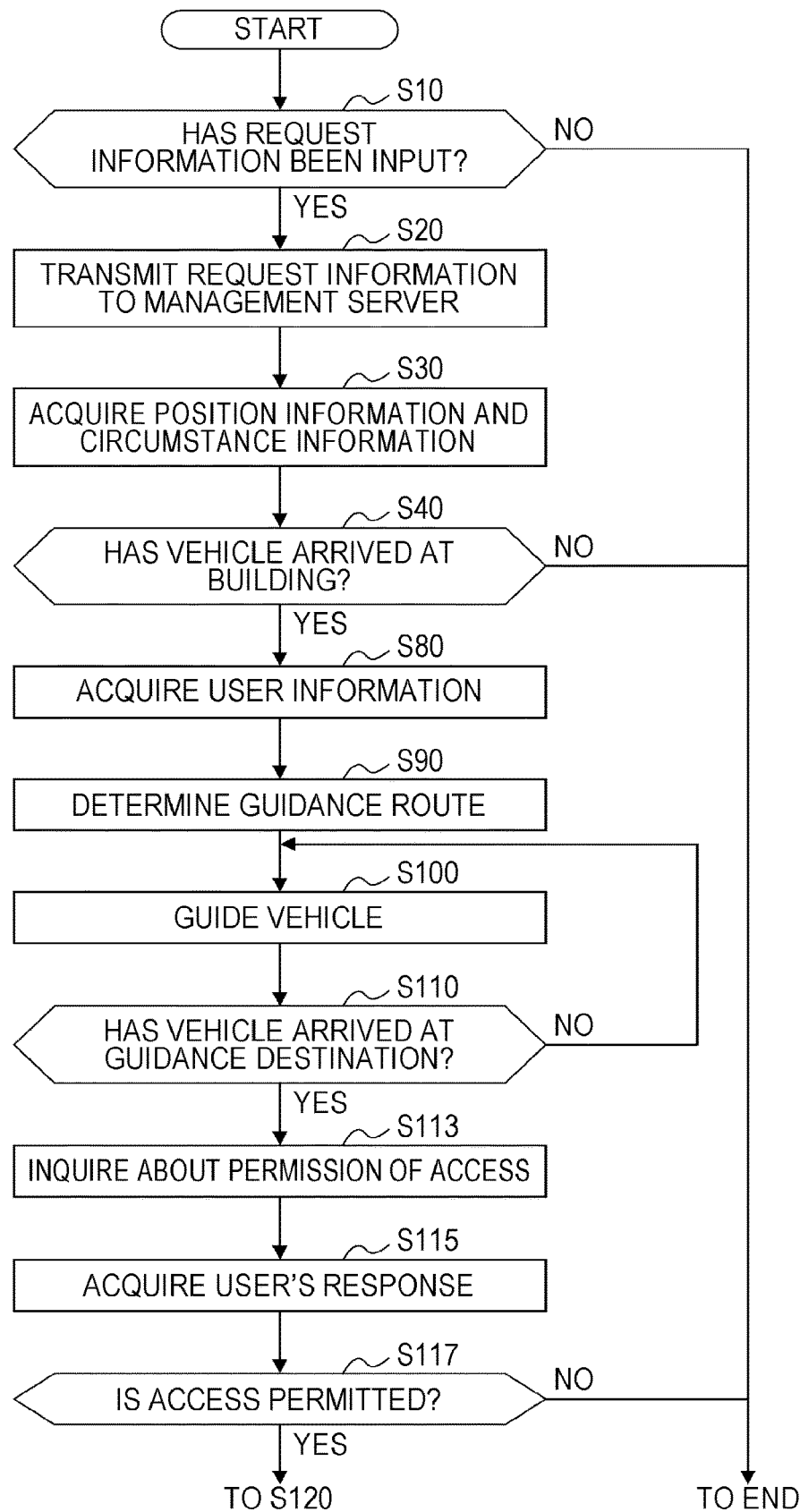
FIG. 6A is a (first) flowchart illustrating a processing method which is performed in accordance with a processing program by a processing device according to a modified example.
Figure 6B:
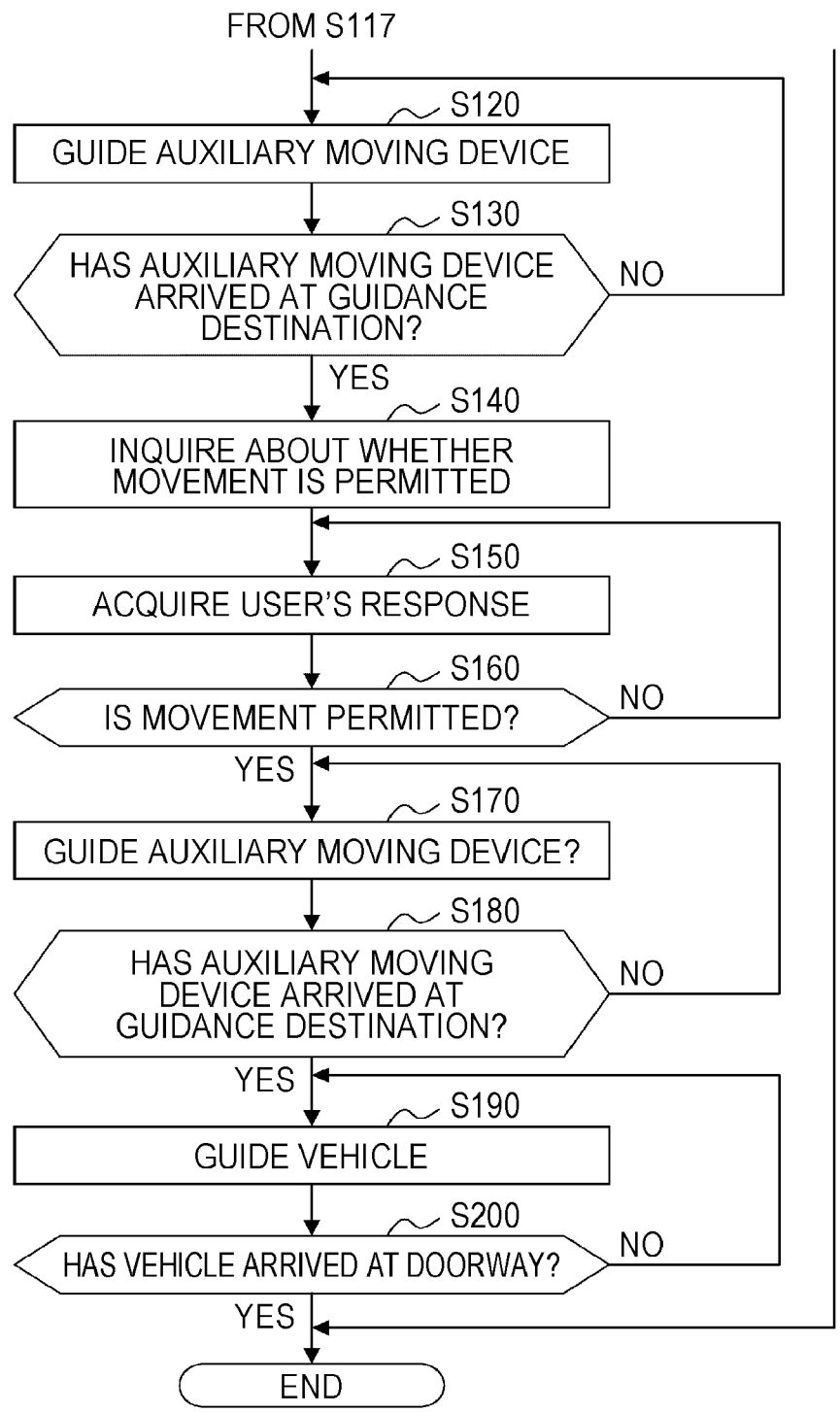
FIG. 6B is a (second) flowchart illustrating the processing method which is performed in accordance with the processing program by the processing device according to the modified example.

FIGS. 6A and 6B are flowcharts illustrating a processing method which is performed in accordance with a processing program by the processing device 1 according to this modified example.

In FIG. 6A, the processes of Steps S10 to S40 are the same as the processes in FIG. 4A. When the determination result of Step S40 is positive, the processing device 1 performs the process of Step S80. The processes of Steps S80 to S110 are the same as the processes in FIGS. 4A and 4B.

When the determination result of Step S110 is positive, the processing device 1 inquires of the user about whether access to the inside of the building is to be permitted in Step S113.

In Step S115, the processing device 1 acquires the user's response to the inquiry of Step S113.

In Step S117, the processing device 1 determines whether the user's response acquired in Step S115 indicates permission of the access.

When the determination result of Step S117 is negative, the processing device 1 ends the process flow of FIGS. 6A and 6B.

On the other hand, when the determination result of Step S117 is positive, the processing device 1 guides the auxiliary moving device 200 in Step S120. In FIG. 6B, the processes of Step S120 and steps subsequent thereto are the same as the processes in FIG. 4B.

In this way, according to this modified example, it is possible to cause a user to ascertain whether access is to be permitted immediately before a vehicle enters the inside of the building 51 and to perform support at a time at which the user has been well prepared.

Second Embodiment

In the first embodiment, the processing device 1 which is provided in the building 51 guides the vehicle 2. However, in a second embodiment, the management server 3 functions as a processing device and guides the vehicle 2. Since the other configurations are the same as described in the first embodiment, the same elements will be referred to by the same reference signs and description thereof will not be repeated.

Figure 7:
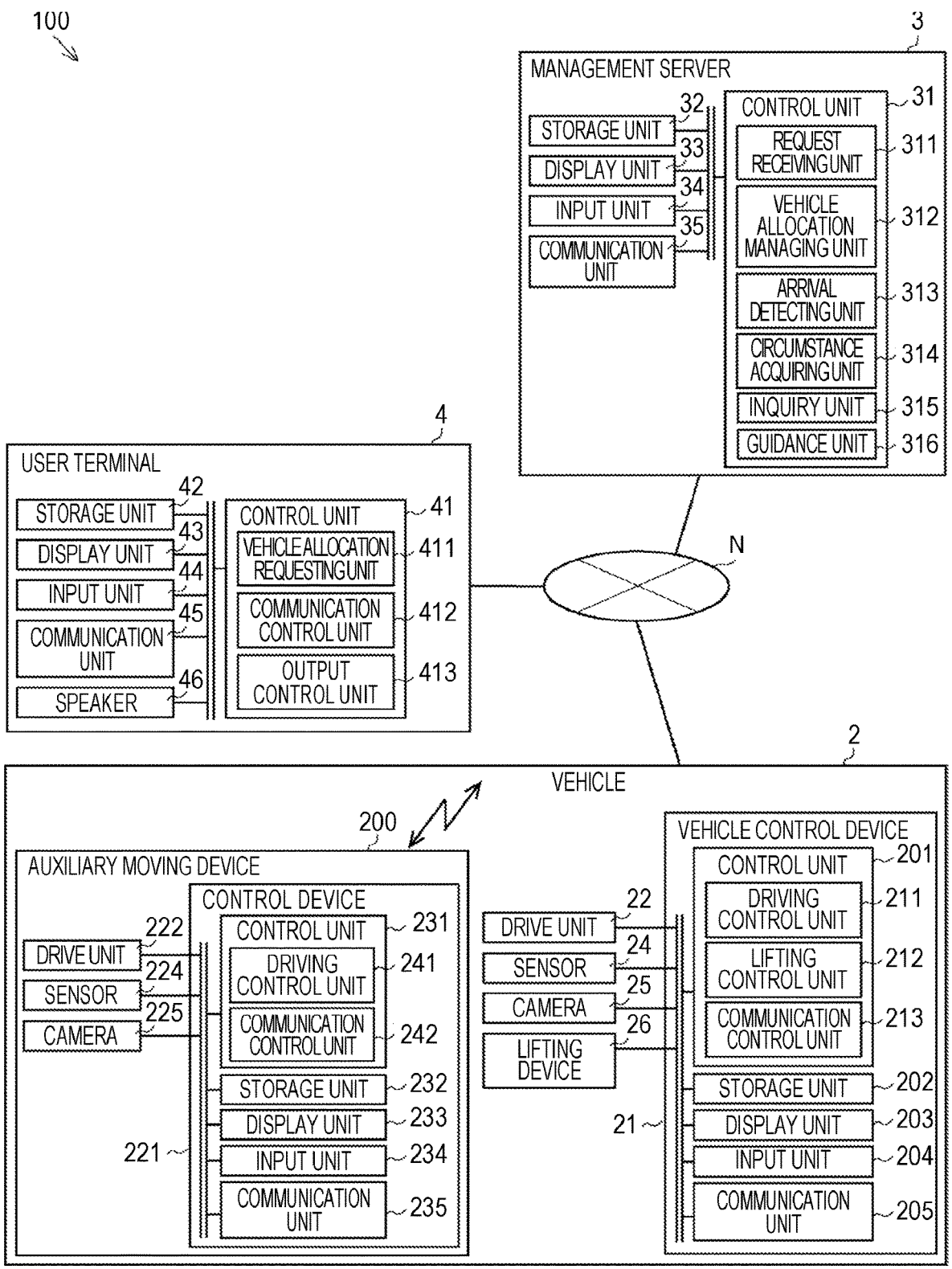
FIG. 7 is a diagram of a configuration of a vehicle management system or the like according to a second embodiment.

FIG. 7 is a diagram illustrating a configuration of a vehicle management system 100 or the like according to the second embodiment, the management server 3 according to this embodiment includes an arrival detecting unit 313, a circumstance acquiring unit 314, an inquiry unit 315, and a guidance unit 316 in addition to the configuration described above and illustrated in FIG. 1.

The request receiving unit 311 receives request information for requesting use of a vehicle 2 from the user terminal 4. For example, when information indicating that the vehicle 2 is used is input to the user terminal 4 by the user's operation, the user terminal 4 transmits the request information to the management server 3. When the user inputs information such as a vehicle allocation time, a destination, or necessary equipment in addition to the request for use, the user terminal 4 adds the input information to the request information and transmits the request information to the management server 3. In this embodiment, the user terminal 4 adds information indicating that support of movement (movement support) between a building and a vehicle is needed to the request information and transmits the request information. Here, the vehicle allocation position (the position of the building) or the information indicating that movement support is necessary may be stored as user information in the storage unit 32 in advance, and the user information corresponding to the user ID may be read and used when the request information is received.

The arrival detecting unit 313 detects that the vehicle 2 arrives at the building to which allocation of a vehicle is requested. Arrival of a vehicle at a building includes, for example, a case in which the vehicle enters the building, a case in which the vehicle 2 enters the same site of the building, and a case in which the vehicle 2 arrives in the vicinity of the building. Here, the case in which the vehicle 2 arrives in the vicinity of a building includes, for example, a case in which the vehicle 2 arrives at a road adjacent to the site of the building, a case in which a distance between the building and the vehicle 2 is equal to or less than a threshold value, a case in which the vehicle 2 can arrive within a predetermined time based on the distance between the building and the vehicle 2 and a speed of the vehicle 2, and a case in which the vehicle 2 arrives at a predetermined area.

The circumstance acquiring unit 314 acquires circumstance information indicating external circumstances such as the outside air temperature, the weather, and the traffic conditions from the vehicle 2 or another server that provides weather information, traffic information, or the like.

When it is detected that a vehicle has arrived, the inquiry unit 315 inquires of the user terminal 4 about whether access of the vehicle to the inside of the building is to be permitted. The inquiry unit 315 acquires the user's response to the inquiry from the user terminal 4. For example, when the user inputs response information indicating whether the access is permitted to the user terminal 4, the user terminal 4 transmits the response information to the management server 3 and the inquiry unit 315 acquires the response information.

The guidance unit 316 guides at least a part of the vehicle 2 to the inside of the building when the access is permitted by the user.

Processing Method

Figure 8A:
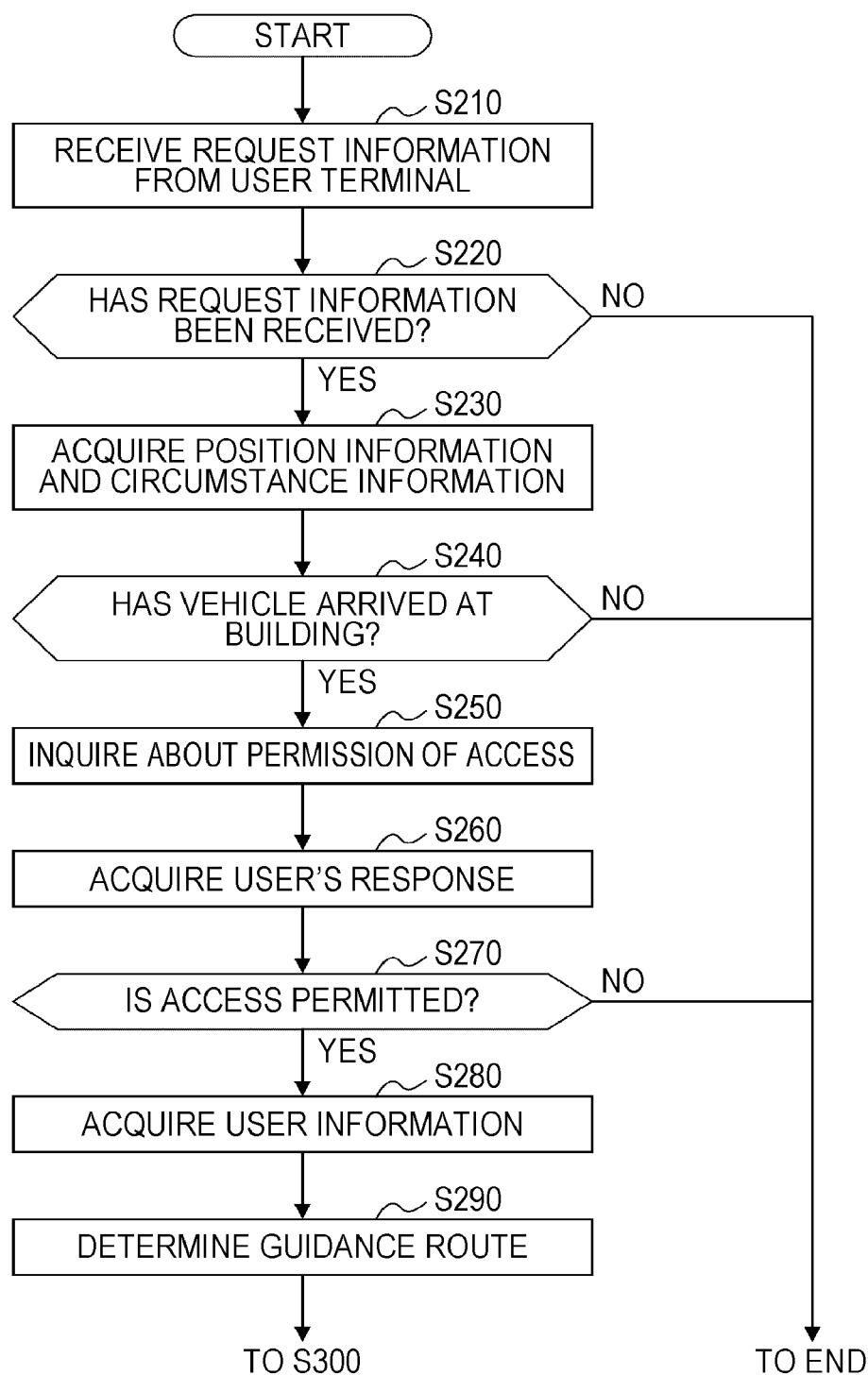
FIG. 8A is a (first) flowchart illustrating a processing method which is performed in accordance with a processing program by a management server.
Figure 8B:
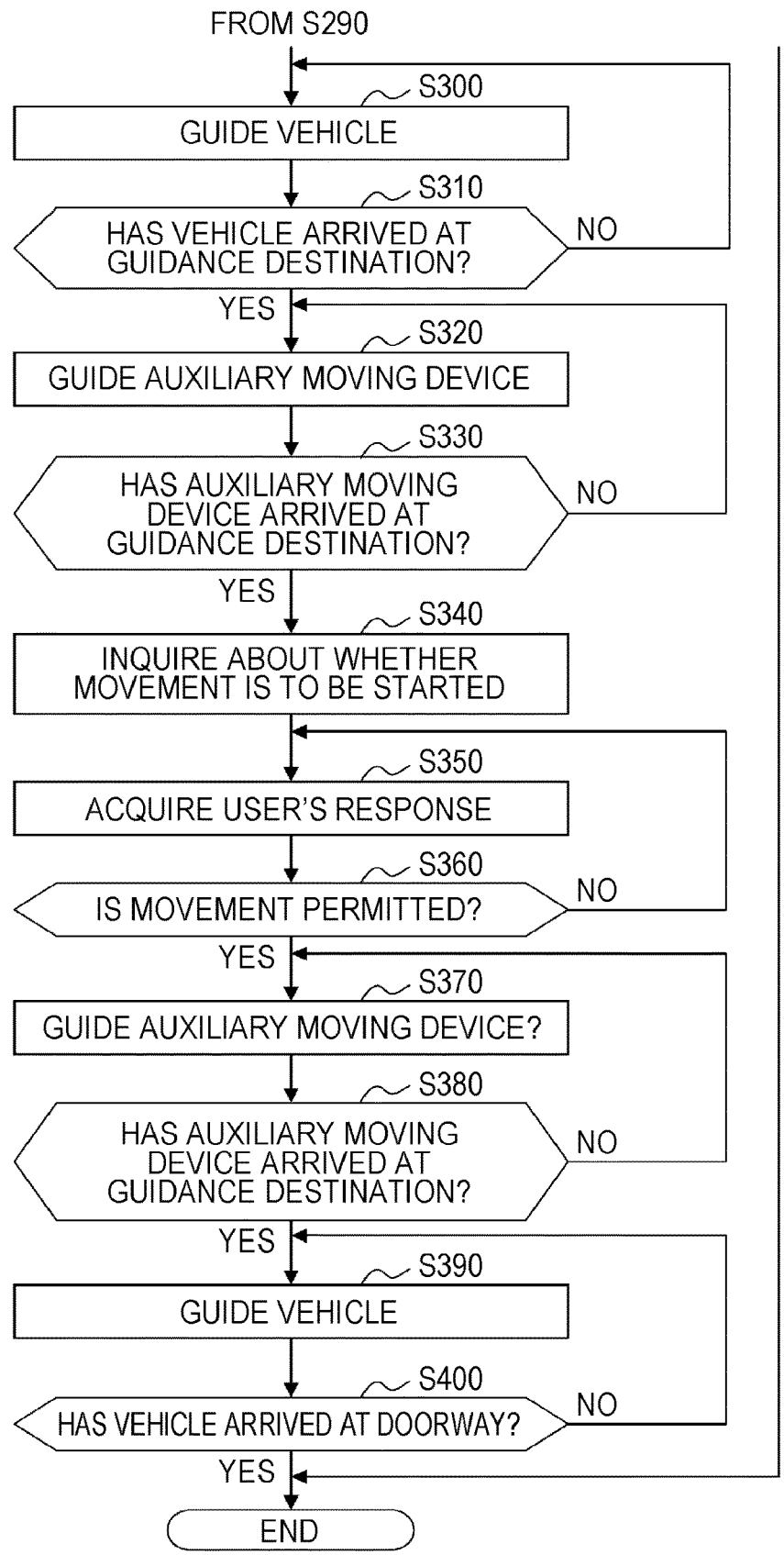
FIG. 8B is a (second) flowchart illustrating the processing method which is performed in accordance with the processing program by the management server.

A process flow which is performed by the management server 3 will be described below. FIGS. 8A and 8B are flowcharts illustrating a processing method which is performed in accordance with a processing program by the management server 3. The management server 3 performs the process flow illustrated in FIGS. 8A and 8B when it is powered on. The process flow of FIGS. 8A and 8B is repeatedly performed until it is powered off or an instruction to stop is issued.

In Step S210, the management server 3 receives request information requesting use of the vehicle 2 from the user terminal 4. In Step S220, the management server 3 determines whether request information has been received in Step S210. When the determination result of Step S220 is negative, the management server 3 ends the process flow illustrated in FIGS. 8A and 8B. On the other hand, when the determination result of Step S220 is positive, the management server 3 acquires position information and circumstance information from the vehicle 2 in Step S230. In Step S240, the management server 3 determines whether the vehicle 2 has arrived in the vicinity of the building 51 based on the position information acquired in Step S230. When the determination result of Step S240 is negative, the management server 3 ends the process flow illustrated in FIGS. 8A and 8B.

When the determination result of Step S240 is positive, that is, when it is detected that the vehicle 2 has arrived in the vicinity of the building 51 in which the user stays, the management server 3 presents the circumstance information to the user and inquires of the user about whether access to the inside of the building 51 is to be permitted in Step S250. For example, the management server 3 transmits the circumstance information indicating external circumstances such as the outside air temperature, the weather, the congestion situation, and a scheduled arrival time at a destination to the user terminal 4 such that the circumstance information is displayed on a display unit or output as a voice message. On the other hand, the user ascertains whether the user is well prepared such as whether a change of clothes is necessary depending on the outside air temperature or whether the medicine for a chronic disease is to be added when an arrival time is delayed, and inputs "permitted" when the user is well prepared and "not permitted" when the user is not well prepared to the management server 3 using the input unit or the user terminal 4. When the access is not permitted, the user may input a time required for permission.

In Step S260, the management server 3 acquires the user's response to the inquiry of Step S250.

In Step S270, the management server 3 determines whether the user's response acquired in Step S260 indicates permission of the access.

When the determination result of Step S270 is negative, the management server 3 ends the process flow of FIGS. 8A and 8B. When a time required for permission is input, the management server 3 may wait for the time and then acquire the user's response again in Step S260.

On the other hand, when the determination result of Step S270 is positive, the management server 3 acquires user information of the user from the storage unit in Step S280.

In Step S290, the management server 3 acquires a guidance route of the vehicle 2 based on the current position of the vehicle 2 and the user information.

In Step S300, the management server 3 generates control information based on the guidance route acquired in Step S290 and guides the vehicle 2 by transmitting the control information to the vehicle 2.

In Step S310, the management server 3 determines whether the vehicle 2 has arrived at a target position to which the vehicle 2 is guided (a guidance destination), for example, an entry position or an exit position. In the example illustrated in FIG. 2, the target position is the door 55.

When the determination result of Step S310 is negative, the management server 3 performs guidance again in Step S300. On the other hand, when the vehicle 2 has arrived at the guidance destination, the vehicle 2 controls the lifting device 26 such that the auxiliary moving device 200 is unloaded from the vehicle 2.

When the vehicle 2 arrives at the guidance destination and the determination result of Step S310 is positive, the management server 3 generates control information based on the guidance route acquired in Step S290 and guides the auxiliary moving device 200 by transmitting the control information to the auxiliary moving device 200 in Step S320.

In Step S330 the management server 3 determines whether the auxiliary moving device 200 has arrived at a target position to which the auxiliary moving device 200 is guided (a guidance destination), for example, an entry position or an exit position. In the example illustrated in FIG. 3, the guidance destination is one side of a bed 61.

When the auxiliary moving device 200 arrives at the side of the bed 61, the user transfers from the bed 61 to the auxiliary moving device 200. The guidance destination of the auxiliary moving device 200 is not limited to the bed side, and can be set to an arbitrary position such as the outside of the door 59 or a living room in a room A18.

When the determination result of Step S330 is negative, the management server 3 performs guidance again in Step S320. On the other hand, when the determination result of Step S330 is positive, the management server 3 inquires of the user about whether movement to the vehicle 2 is to be started in Step S340. For example, the management server 3 transmits a message of "May movement be started?" to the user terminal 4 such that the message is displayed on the display unit or output as voice from the speaker.

In Step S350, the management server 3 acquires the user's response to the inquiry in Step S340. In Step S360, the management server 3 determines whether the user's response acquired in Step S350 indicates that movement is to be started.

When the determination result of Step S360 is negative, the management server 3 repeatedly acquires the user's response in Step S350.

On the other hand, when the determination result of Step S360 is positive, the management server 3 generates control information such that the auxiliary moving device 200 moves to the vehicle 2 based on the guidance route acquired in Step S290 and guides the auxiliary moving device 200 by transmitting the control information to the auxiliary moving device 200 in Step S370.

In Step S380, the management server 3 determines whether the auxiliary moving device 200 has arrived at the vehicle 2 (a guidance destination) and has been stored in the vehicle 2.

When the determination result of Step S380 is negative, the management server 3 repeatedly guides the auxiliary moving device 200 in Step S370.

On the other hand, when the auxiliary moving device 200 has arrived at the position of the vehicle 2, the auxiliary moving device 200 ascends the slope (the lifting device 26) and enters the vehicle 2, and the vehicle control device 21 of the vehicle 2 stores the lifting device 26 and closes the rear door 29.

In this way, when the auxiliary moving device 200 arrives at the vehicle 2 and the determination result of Step S380 is positive, the management server 3 generates control information such that the vehicle 2 moves from the door 55 to the doorway 54 based on the guidance route acquired in Step S290 and guides the vehicle 2 by transmitting the control information to the vehicle 2 in Step S390.

In Step S400, the management server 3 determines whether the vehicle 2 has arrived at the doorway 54. When the determination result of Step S400 is negative, the management server 3 performs guidance again in Step S390. On the other hand, when the determination result of Step S400 is positive, that is, when the vehicle 2 has been guided to the doorway 54, the management server 3 ends the process flow of FIGS. 8A and 8B and the vehicle 2 sets the exit position acquired from the management server 3 as a destination and travels autonomously.

In this way, according to this embodiment, since the management server 3 guides the vehicle 2, it is possible to support movement of the user who uses the vehicle 2 between the building 51 and the vehicle 2.

The processes or units which have been described above in the present disclosure can be freely combined in embodiments as long as no technical contradictions arise.

A process which has been described to be performed by a single device may be distributed and performed by a plurality of devices. Alternatively, processes which have been described to be performed by different devices may be performed by a single device. In a computer system, the hardware configuration (server configuration) that embodies each function can be flexibly changed.

The disclosure can also be embodied by supplying a computer program storing the functions described above in the above-mentioned embodiments to a computer and causing one or more processors of the computer to read and execute the computer program. Such a computer program may be provided to the computer via a non-transitory computer-readable storage medium which can access a system bus of the computer or may be provided to the computer via a network. Examples of the non-transitory computer-readable storage medium include an arbitrary type of disk such as a magnetic disk (such as a Floppy (registered trademark) disk or a hard disk drive (HDD)) or an optical disc (such as a CD-ROM a DVD disc, or a Blu-ray disc), a read only memory (ROM), a random access memory (RAM), an EPROM, an EEPROM, a magnetic card, a flash memory, an optical card, and an arbitrary type of medium which is suitable for storing electronic commands.

What is claimed is:

1. A processing device comprising a control unit configured to perform:
   requesting a vehicle which a user desires to use to move to a building in which the processing device is provided and in which the user stays;
   detecting that the vehicle reaches a vicinity of the building;
   inquiring of the user about whether access of the vehicle to the inside of the building is permitted when it is detected that the vehicle reaches the vicinity of the building; and
   guiding at least a part of the vehicle to the inside of the building when the access is permitted by the user,
   wherein the part of the vehicle which is guided to the inside of the building when the access is permitted is an auxiliary moving device configured to load the user and move.

2. A processing device that manages a vehicle, the processing device comprising a control unit configured to perform:
   receiving a request for the vehicle to move to a building in which a user stays from the user who desires to use the vehicle;
   notifying that the vehicle reaches a vicinity of the building;
   inquiring of the user about whether access of the vehicle to the inside of the building is permitted when it is detected that the vehicle reaches the vicinity of the building; and
   guiding at least a part of the vehicle to the inside of the building when the access is permitted by the user,
   wherein the part of the vehicle which is guided to the inside of the building when the access is permitted is an auxiliary moving device configured to load the user and move.

3. The processing device according to claim 1, wherein the control unit is configured to further perform:
   acquiring a stop position of the vehicle when the vehicle arrives and stops in the vicinity of the building; and
   requesting a guidance route from the stop position to the inside of the building, and
   wherein the control unit is configured to guide the auxiliary moving device based on the guidance route.

4. The processing device according to claim 1, wherein the user is notified of at least one of an outside air temperature, weather, and a scheduled arrival time at a destination when the inquiring is performed.

5. A processing method of causing a computer to perform:
   requesting a vehicle which a user desires to use to move to a building in which the processing device is provided and in which the user stays;
   detecting that the vehicle reaches a vicinity of the building;
   inquiring of the user about whether access of the vehicle to the inside of the building is permitted when it is detected that the vehicle reaches the vicinity of the building; and
   guiding at least a part of the vehicle to the inside of the building when the access is permitted by the user,
   wherein the part of the vehicle which is guided to the inside of the building when the access is permitted is an auxiliary moving device configured to load the user and move.

6. A processing program causing a computer to perform:
   requesting a vehicle which a user desires to use to move to a building in which the processing device is provided and in which the user stays:
   detecting that the vehicle reaches a vicinity of the building;
   inquiring of the user about whether access of the vehicle to the inside of the building is permitted when it is detected that the vehicle reaches the vicinity of the building; and
   guiding at least a part of the vehicle to the inside of the building when the access is permitted by the user,
   wherein the part of the vehicle which is guided to the inside of the building when the access is permitted is an auxiliary moving device configured to load the user and move.

7. The processing device according to claim 2, wherein the control unit is configured to further perform:
   acquiring a stop position of the vehicle when the vehicle arrives and stops in the vicinity of the building; and
   requesting a guidance route from the stop position to the inside of the building, and
   wherein the control unit is configured to guide the auxiliary moving device based on the guidance route.

8. The processing device according to claim 2, wherein the user is notified of at least one of an outside air temperature, weather, and a scheduled arrival time at a destination when the inquiring is performed.

9. The processing device according to claim 1, wherein the auxiliary moving device is further configured to carry the user.

* * * * *